United States Patent
Ma

(10) Patent No.: US 8,228,667 B2
(45) Date of Patent: Jul. 24, 2012

(54) ELECTRONIC DEVICE CAPABLE OF PROVIDING A DISPLAY PANEL WITH PLANAR SUPPORT

(75) Inventor: Hsin-Hua Ma, Taipei Hsien (TW)

(73) Assignee: Wistron Corporation, Xizhi Dist., New Taipei (TW)

(*) Notice: Subject to any disclaimer, the term of this patent is extended or adjusted under 35 U.S.C. 154(b) by 239 days.

(21) Appl. No.: 12/859,261

(22) Filed: Aug. 19, 2010

(65) Prior Publication Data

US 2011/0286157 A1    Nov. 24, 2011

(30) Foreign Application Priority Data

May 21, 2010 (TW) .............................. 99116279 A

(51) Int. Cl.
*G06F 1/16* (2006.01)
(52) U.S. Cl. ................................................. 361/679.01
(58) Field of Classification Search ............. 361/679.01, 361/679.15
See application file for complete search history.

(56) References Cited

U.S. PATENT DOCUMENTS

| | | | |
|---|---|---|---|
| 6,762,929 B2* | 7/2004 | Sawyer | 361/679.05 |
| 7,196,692 B2* | 3/2007 | Mochizuki et al. | 345/168 |
| 7,310,050 B2* | 12/2007 | Yeh | 340/815.83 |
| 7,426,107 B2* | 9/2008 | Yeh et al. | 361/679.27 |
| 7,532,460 B2* | 5/2009 | Singh et al. | 361/679.15 |
| 7,558,057 B1* | 7/2009 | Naksen et al. | 361/679.56 |
| 7,667,962 B2* | 2/2010 | Mullen | 361/679.56 |
| 7,724,508 B2* | 5/2010 | Bemelmans et al. | 361/679.09 |
| 7,830,333 B2* | 11/2010 | Aoki | 345/1.3 |
| 8,009,421 B2* | 8/2011 | Misawa | 361/679.55 |
| 8,035,577 B2* | 10/2011 | Lafarre et al. | 345/55 |
| 2006/0209218 A1* | 9/2006 | Lee et al. | 349/1 |
| 2008/0151480 A1* | 6/2008 | Chung et al. | 361/681 |
| 2008/0198541 A1* | 8/2008 | Lin et al. | 361/681 |
| 2008/0223746 A1* | 9/2008 | Van Rens et al. | 206/454 |
| 2008/0247126 A1* | 10/2008 | Otsuka et al. | 361/681 |
| 2010/0164837 A1* | 7/2010 | Kao et al. | 345/1.3 |
| 2010/0164973 A1* | 7/2010 | Huitema et al. | 345/581 |
| 2010/0182738 A1* | 7/2010 | Visser et al. | 361/679.01 |
| 2010/0208417 A1* | 8/2010 | Visser et al. | 361/679.01 |
| 2010/0232094 A1* | 9/2010 | Chen | 361/679.01 |
| 2010/0246113 A1* | 9/2010 | Visser et al. | 361/679.3 |
| 2011/0102976 A1* | 5/2011 | Chen | 361/679.01 |
| 2012/0002357 A1* | 1/2012 | Auld et al. | 361/679.01 |

FOREIGN PATENT DOCUMENTS

TW    M369468    11/2009

* cited by examiner

*Primary Examiner* — Lisa Lea Edmonds
(74) *Attorney, Agent, or Firm* — Winston Hsu; Scott Margo

(57) ABSTRACT

An electronic device includes a main body and a flexible display panel. The main body includes a body portion, a connecting portion, and a cover portion. The connecting portion is pivotally connected to the body portion. The cover portion is pivotally connected to the connecting portion so as to be capable of rotating relative to the body portion. The cover portion, the body portion, and the connecting portion form a containing space cooperatively. The flexible display panel is disposed in the containing space in a curved manner. The flexible display panel includes a first display section and a second display section. The first display section is fixed to the cover portion. The second display section is slidably disposed on the body portion.

18 Claims, 14 Drawing Sheets

ELECTRONIC DEVICE CAPABLE OF PROVIDING A DISPLAY PANEL WITH PLANAR SUPPORT

BACKGROUND OF THE INVENTION

1. Field of the Invention

The present invention relates to an electronic device, and more particularly, to an electronic device capable of providing a display panel with planar support.

2. Description of the Prior Art

A current electronic reading device often adopts a conventional LCD or a hard display panel. With development of flexible display panel technology (such as electronic-paper), a flexible display panel is applied for an electronic reading device. A related design can be referred to the Readius by Polymer Vision Inc., Ltd. and to Taiwan Patent No. M369468. As shown in FIG. 1 and FIG. 2 provided by Taiwan Patent No. M369468, a sectional folding mechanism is utilized to reduce a folded volume of the electronic reading device and solve the problem that an inner flexible display panel and an outer main body of the electronic reading device are not identical in length when they are expanded horizontally. However, when the flexible display panel is expanded horizontally, such kind of design will cause the flexible display panel can not be fully supported at a position where the sectional folding mechanism is disposed. Accordingly, the flexible display panel will damage due to a press stress at the said position.

Thus, how to design a folding mechanism which can provide a flexible display panel with a better planar support is an important issue in the structural design of an electronic device having the flexible display panel.

SUMMARY OF THE INVENTION

The present invention provides an electronic device capable of providing a display panel with planar support. The electronic device comprises a main body and a flexible display panel. The main body comprises a body portion and a cover portion. The connecting portion is pivotally connected to the main body portion, the cover portion is connected to the connecting portion so as to be capable of rotating relative to the body portion, and a containing space is formed by the cover portion, the body portion and the connecting portion. The flexible display panel is disposed in the containing space in a curved manner, and comprises a first display section and a second display section. The first display section is fixed to the cover portion, and the second display section is slidably disposed on the body portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
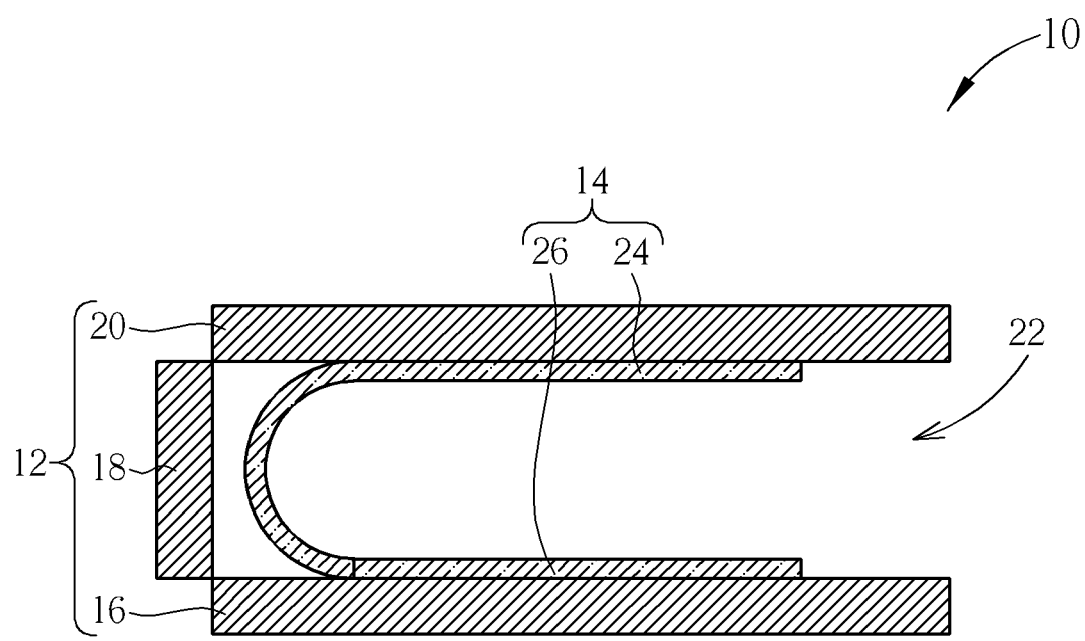
FIG. 1 is a sectional diagram of an electronic device according to a first embodiment of the present invention.

Please refer to FIG. 1, which is a sectional diagram of an electronic device 10 according to a first embodiment of the present invention. The electronic device 10 includes a main body 12 and a flexible display panel 14. The main body 12 includes a body portion 16, a connecting portion 18 and a cover portion 20. The connecting portion 18 is pivotally connected to the body portion 16 and the cover portion 20 respectively, so as to make the cover portion 20 capable of rotating relative to the body portion 16. Thus, the electronic device 10 can not only be used as a planar electronic reading device but also be in a folded state for a user to take conveniently. When the electronic device 10 is in the folded state, the flexible display panel 14 is disposed inside a containing space 22 in a curved manner, wherein the containing space 22 is formed by the body portion 16, the connecting portion 18 and the cover portion 20. In this embodiment, the flexible display panel 14 is, but not limited to, an electronic-paper display device. The flexible display panel 14 can also be other common flexible display device, such as an OLED (Organic Light Emitting Diode) display panel and so on. The flexible display panel 14 includes a first display section 24 and a second display section 26. In this embodiment, the first display section 24 is, but not limited to, fixed to the cover portion 20, and the second display section 26 is slidably disposed on the body portion 16. The electronic device 10 can also adopt a design that the second display section 26 is fixed to the body portion 16 and the first section display section 24 is slidably disposed on the cover portion 20. Furthermore, related circuits and components of the electronic device 10, such as a circuit board, a random access memory, a processor, a battery and so on, can be embedded in the body portion 16 or disposed inside another independent casing (not shown), and then connected to the body portion 16. The related description will be omitted herein since it is commonly seen in the prior art.

As for the said design that the first display section 24 is fixed to the cover portion 20, it can be achieved by electrical connection between the flexible display panel 14 and the main body 12, such as electrical connection between a flexible printed circuit of the flexible display panel 14 and a control circuit board in the main body 12 to fix a relative position of the first display section 24 and the cover portion 20. The method for fixing the flexible display panel 14 to the cover portion 20 is not limited to the said design. For example, the flexible display panel 14 can be attached to the cover portion 20 by glue instead, so as to fix a relative position of the first display section 24 and the cover portion 20.

Figure 2:
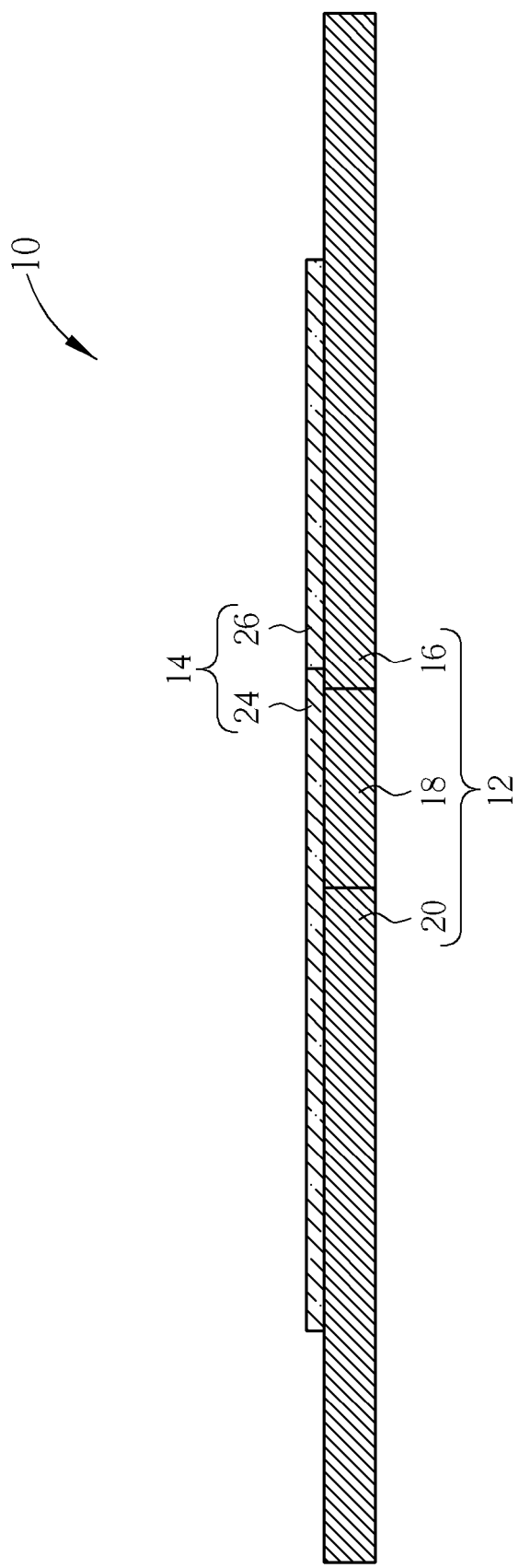
FIG. 2 is a sectional diagram of the electronic device in FIG. 1 when being in an expanded state.

More detailed description for operation of the electronic device 10 is provided as follows. Please refer to FIG. 1 and FIG. 2. FIG. 2 is a sectional diagram of the electronic device 10 in FIG. 1 when being in an expanded state. As shown in FIG. 1, as the flexible display panel 14 is folded up in the containing space 22, the electronic device 10 not only takes a foldable design of the main body 12 to protect the flexible display panel 14, but also has a smaller volume for the user to carry conveniently. If the user wants to use the flexible display panel 14 folded up inside the containing space 22 for watching a displayed content, the user can open the cover portion 20 to rotate relative to the connecting portion 18 and the body portion 16, so that the main body 12 can be changed from a folded state in FIG. 1 to an expanded state in FIG. 2. During the said rotating process, because the first display section 24 is fixed to the cover portion 20 and the second display section 26 is slidably disposed on the body portion 16, the first display section 24 can be moved from a position in FIG. 1 to a position in FIG. 2 with rotary of the cover portion 20, and the second display section 26 can be pulled by the first display section 24 from a position in FIG. 1 to a position in FIG. 2. Accordingly, the electronic device 10 is in the expanded state for the user to operate.

In such a manner, the electronic device 10 not only provides an operating sense of opening books, but also provides a bottom of the flexible display panel 14 with a fully planar support by the body portion 16, connecting portion 18 and the cover portion 20 when the flexible display panel 14 is in the expanded state. Accordingly, the user can operate the flexible display panel 14 (such as a touch by a touch pen) without concerning damage of the flexible display panel 14 due to a large force applied by the user or no support from the bottom of the flexible display panel 14.

On the other hand, as the user wants to fold up the electronic device 10, the user just needs to pull the cover portion 20 to rotate relative to the connecting portion 18 and the body portion 16, such that the main body 12 can recover from the expanded state in FIG. 2 to the folded state in FIG. 1. During the said rotating process, the first display section 24 will be folded from a position in FIG. 2 to a position in FIG. 1 with rotary of the cover portion 20. In such a manner, the electronic device 10 not only protects the flexile display panel 14 by the foldable design of the main body 12, but also enhances portability due to a smaller volume in the folded state.

Figure 3:
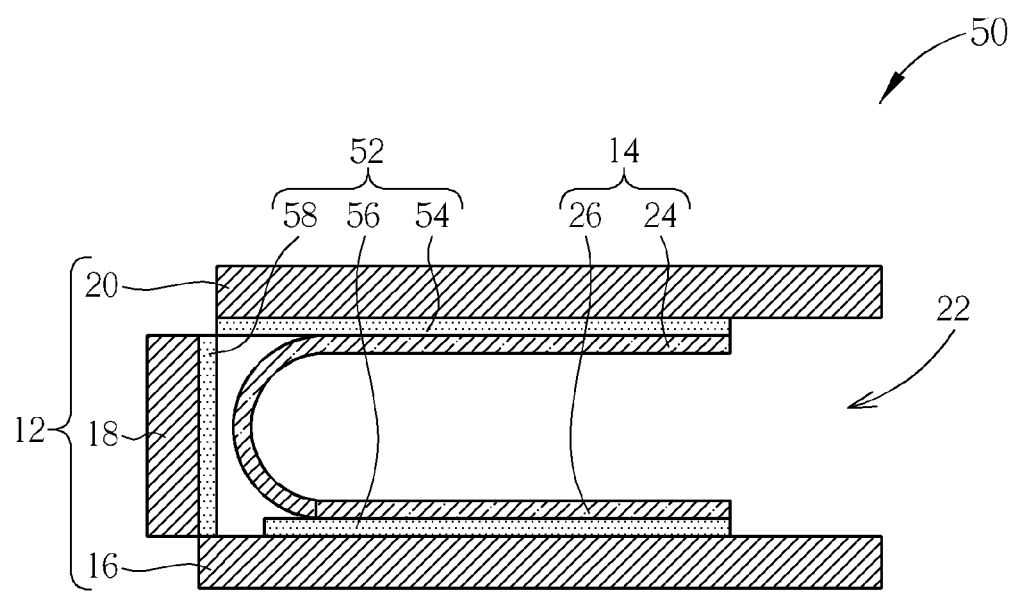
FIG. 3 is a sectional diagram of an electronic device according to a second embodiment of the present invention.

Please refer to FIG. 3, which is a sectional diagram of an electronic device 50 according to a second embodiment of the present invention. Components both mentioned in the second embodiment and the first embodiment represent components with similar functions or structures, and the related description is therefore omitted herein. The major difference between the electronic device 50 in the second embodiment and the electronic device 10 in the first embodiment is the structural design of the supporting structure. As shown in FIG. 3, the electronic device 50 includes the main body 12, the flexible display panel 14 and a supporting structure 52. The supporting structure 52 is disposed between the main body 12 and the flexible display panel 14. The supporting structure 52 is used for providing supporting force to the flexible display panel 14 when the cover portion 20 is rotated to the same horizontal surface where the connecting portion 18 and the body portion 16 are located. The supporting structure 52 includes a first supporting layer 54, a second supporting layer 56 and a third supporting layer 58. The first supporting layer 54 is disposed between the cover portion 20 and the first display section 24 and is used for providing supporting force to the first display section 24. The second supporting layer 56 is disposed between the second display section 26 and the main body 16, and is used for providing supporting force to the second display section 26. The third supporting layer 58 is attached to the connecting portion 18. The third supporting layer 58 is used for abutting against the first supporting layer 54 and the second supporting layer 56 when the cover portion 20 is rotated to the same horizontal surface where the connecting portion 18 and the body portion 16 are located, so as to support the first display section 24 and the second display section 26 cooperatively with the first supporting layer 54 and the second supporting layer 56.

Figure 4:
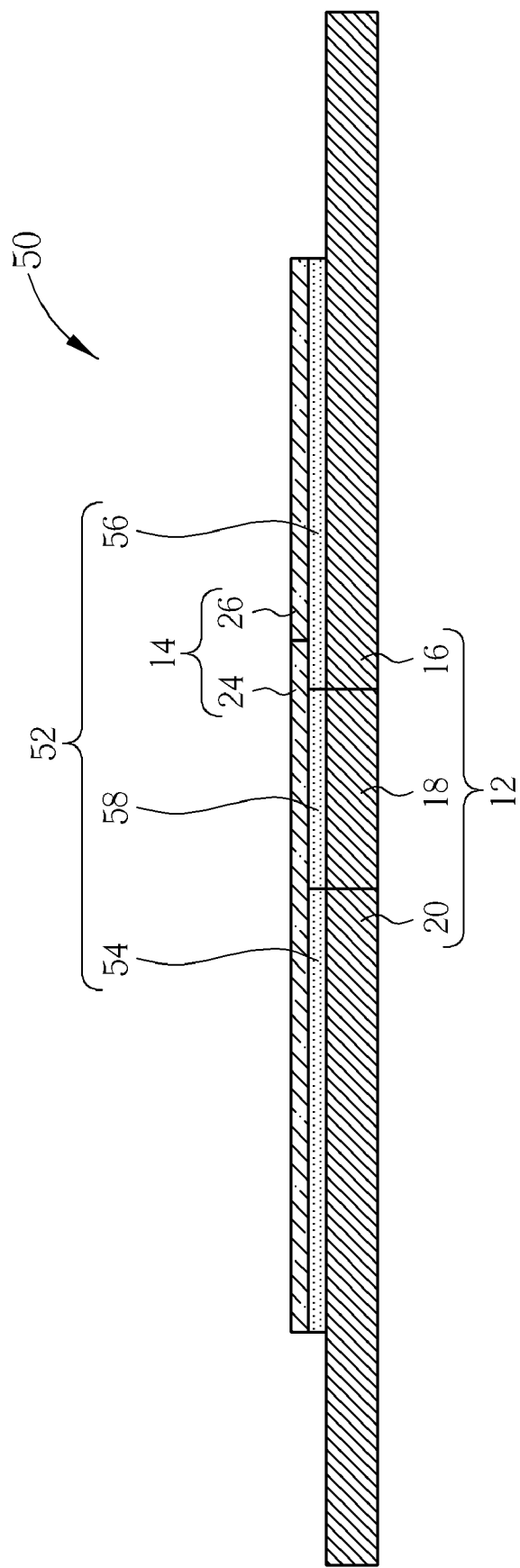
FIG. 4 is a sectional diagram of the electronic device in FIG. 3 when being in an expanded state.

More detailed description for operation of the electronic device 50 is provided as follows. Please refer to FIG. 3 and FIG. 4. FIG. 4 is a sectional diagram of the electronic device 50 in FIG. 3 when being in an expanded state. As shown in FIG. 3, if the user wants to use the flexible display panel 14 for watching a displayed content, the user can open the cover portion 20 to rotate relative to the connecting portion 18 and the body portion 16, so that the main body 12 can be changed from a folded state in FIG. 3 to an expanded state in FIG. 4. During the said rotating process, the first supporting layer 54, the second supporting layer 56 and the third supporting layer 58 can be rotated with the cover portion 20 from a relatively folded state in FIG. 3 to a mutually abutting state in FIG. 4. Thus, the electronic device 50 not only provides an operating sense of opening books by the said operation of rotating the cover portion 20, but also provides a bottom of the flexible display panel 14 with a fully planar support by the main body 12 and the supporting structure 52 when the flexible display panel 14 is horizontally expanded. Accordingly, damage of the flexible display panel 14 due to a large force applied by the user or no support from the bottom of the flexible display panel 14 can be avoided.

Figure 5:
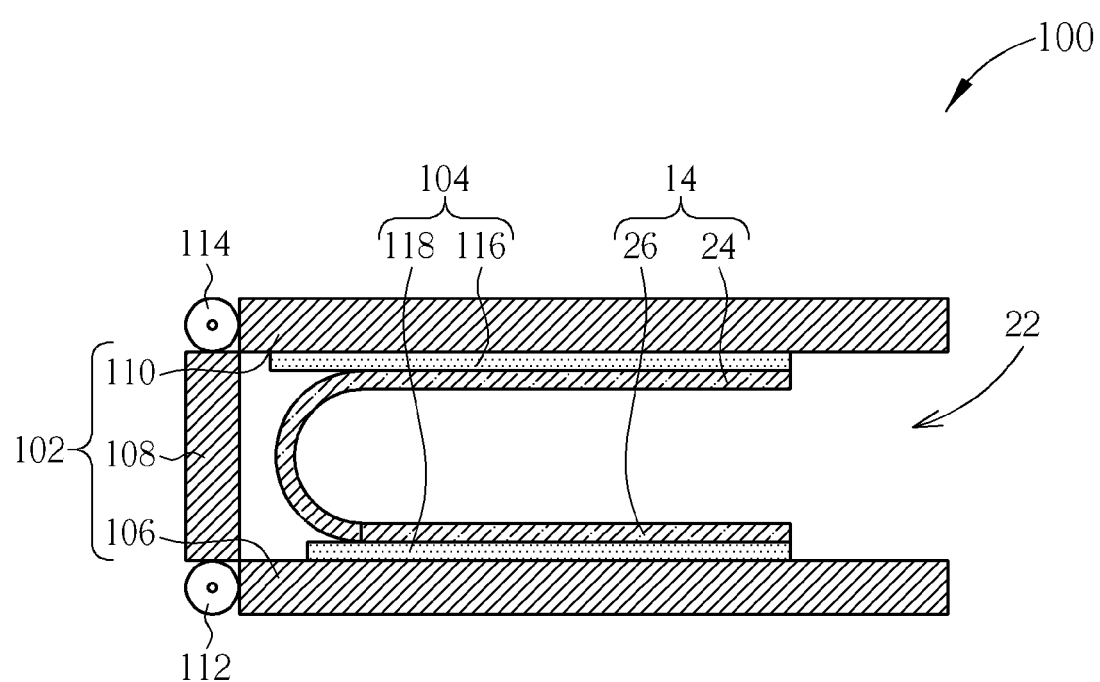
FIG. 5 is a sectional diagram of the electronic device according to a third embodiment of the present invention.
Figure 6:
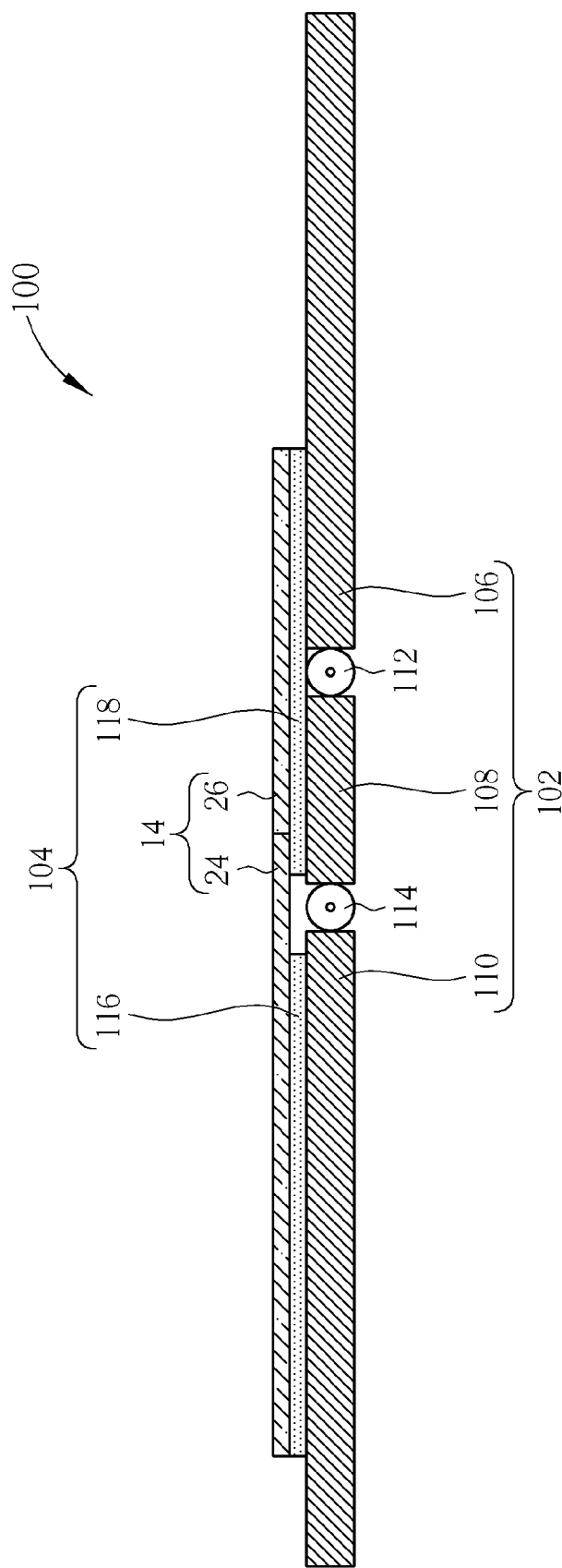
FIG. 6 is a sectional diagram of the electronic device in FIG. 5 when being an expanded state.

The pivotal connection between the connecting portion 18, the body portion 16 and the cover portion 20 is not limited to that in the aforementioned embodiment. For example, please refer to FIG. 5 and FIG. 6. FIG. 5 is a sectional diagram of the electronic device 100 according to a third embodiment of the present invention. FIG. 6 is a sectional diagram of the electronic device 100 in FIG. 5 when being in an expanded state. Components both mentioned in the third embodiment and the second embodiment represent components with similar functions or structures, and the related description is therefore omitted herein. The main difference between the electronic device 100 in the third embodiment and the electronic device 50 in the second embodiment is the pivotal design of the main body and omission of the third supporting layer. As shown in FIG. 5, the electronic device 100 includes a main body 102, the flexible display panel 14 and a supporting structure 104. The main body 102 includes a body portion 106, a connecting portion 108 and a cover portion 110. The connecting portion 108 is pivotally connected to the body portion 106 and the cover portion 110 respectively by pivot shafts 112, 114 in FIG. 5 to make the cover portion 110 capable of rotating relative to the body portion 106. Thus, the electronic device 100 can be used as a planar electronic reading device when being in an expanded state or be in a folded state for the user to carry conveniently. The supporting structure 104 is disposed between the main body 102 and the flexible display panel 14. The supporting structure 104 includes a first supporting layer 116 and a second supporting layer 118. The first supporting layer 116 is disposed between the cover portion 110 and the first display section 24, and the second supporting layer 118 is disposed between the second display section 26 and the body portion 106. The first supporting layer 116 and the second supporting layer 118 are used for providing the first display section 24 and the second display section 26 with supporting force respectively. Furthermore, in the design that the said pivot shafts 112 and 114 are utilized to make the cover portion 110 capable of rotating relative to the body portion 106, the said third supporting layer can be an omissible component.

As for operation of the electronic device 100, the detailed description is omitted herein since it is similar to that of the electronic device 50. In brief, when the user pulls the cover portion 110 to rotate relative to the connecting portion 108 and the body portion 106, the electronic device 100 can be changed between a folded state in FIG. 5 and the expanded state in FIG. 6, whereby the user can read or carry.

Figure 7:
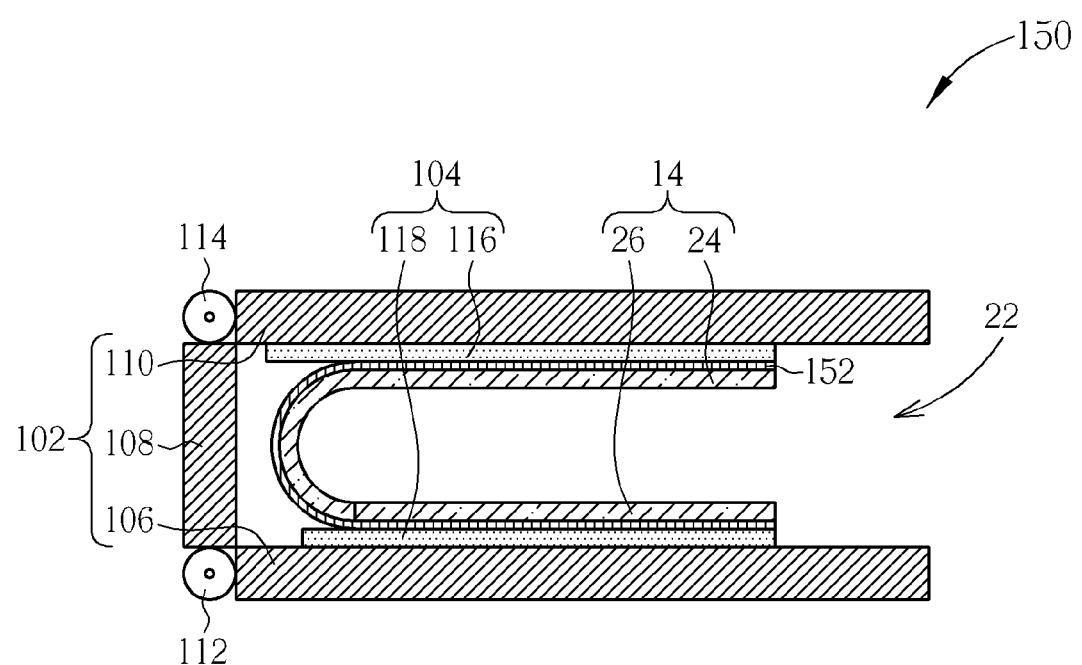
FIG. 7 is a sectional diagram of the electronic device according to a fourth embodiment of the present invention.
Figure 8:
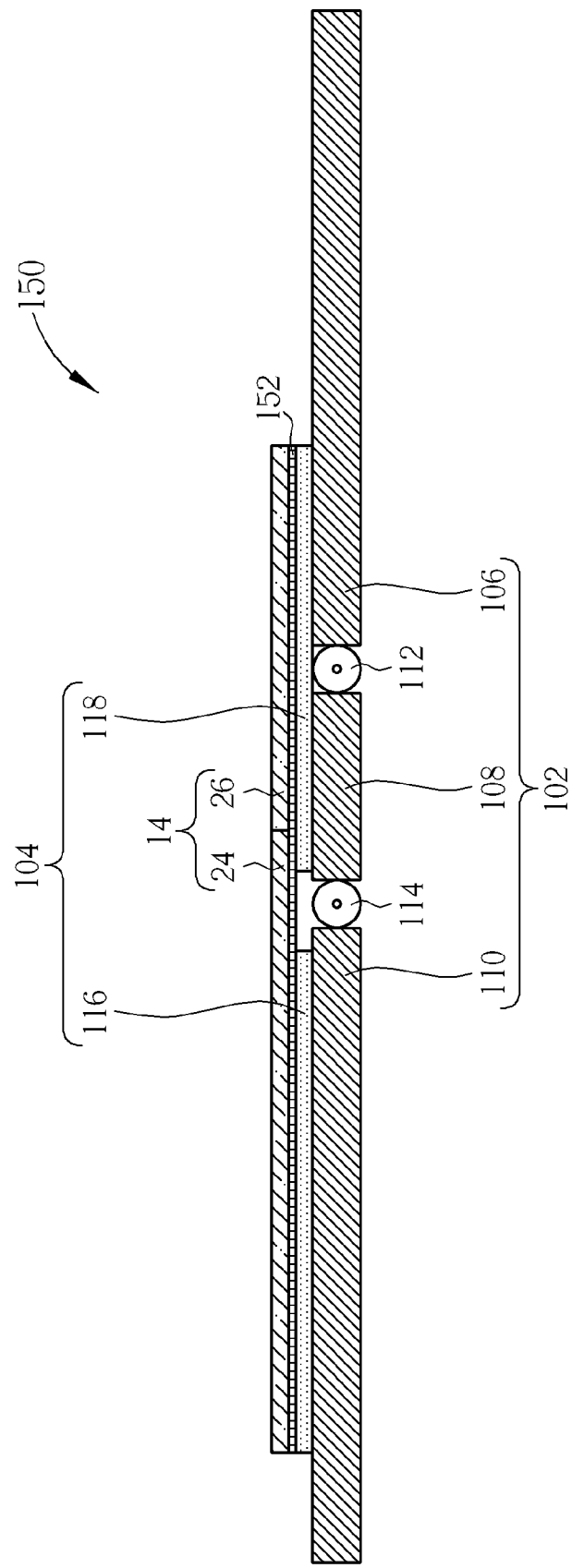
FIG. 8 is a sectional diagram of the electronic device in FIG. 7 when being in an expanded state.

Please refer to FIG. 7 and FIG. 8. FIG. 7 is a sectional diagram of the electronic device 150 according to a fourth embodiment of the present invention. FIG. 8 is a sectional diagram of the electronic device 100 in FIG. 7 when being in an expanded state. Components both mentioned in the fourth embodiment and the third embodiment represent components with similar functions or structures, and the related description is therefore omitted herein. The main difference between the electronic device 150 in the fourth embodiment and the electronic device 100 in the third embodiment is disposal of a soft protecting layer. As shown in FIG. 7, the electronic device 150 includes the main body 102, the flexible display panel 14, the supporting structure 104 and a soft protecting layer 152. The soft protecting layer 152 is attached to a side of the flexible display panel 14 corresponding to the main body 102 and disposed between the flexible display panel 14 and the supporting structure 104. The soft protecting layer 152 is made of soft material, such as rubber, foam material and so on. Accordingly, the soft protecting layer 152 can disperse force exerted on the flexible display panel 14 by its physical property. For example, if the flexible display panel 14 is a touch panel, the user may use his finger or a touch pen to input. At this time, the soft protecting layer 152 can disperse partial load on the flexible display panel 14.

As for operation of the electronic device 150, the detailed description is omitted herein since it is similar to that of the electronic device 100. In brief, via protection of the soft protecting layer 152 and cooperative support of the main body 102 and the supporting structure 104, the electronic device 150 can provide a bottom of the flexible display panel 14 with a cushion protection and a fully planar support when the flexible display panel 14 is in an expanded state. Accordingly, damage of the flexible display panel 14 due to a large force applied by the user or no support from the bottom of flexible display panel 14 can be avoided.

Figure 9:
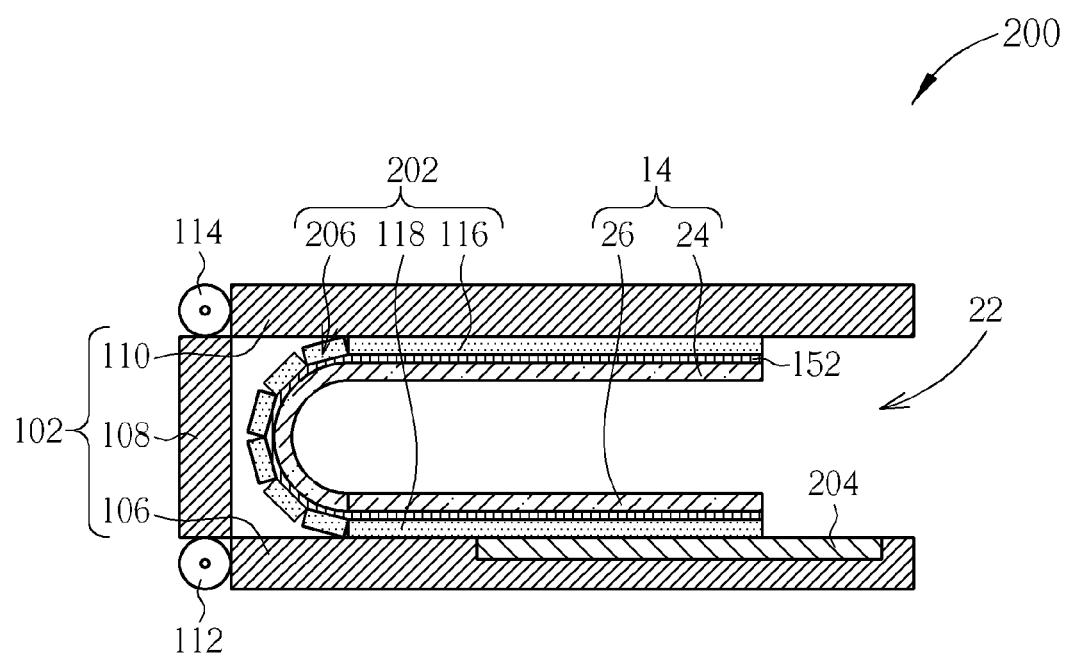
FIG. 9 is a sectional diagram of an electronic device according to a fifth embodiment of the present invention.

Please refer to FIG. 9, which is a sectional diagram of an electronic device 200 according to a fifth embodiment of the present invention. Components both mentioned in the fifth embodiment and the fourth embodiment represent components with similar functions or structures, and the related description is therefore omitted herein. The major difference between the electronic device 200 in the fifth embodiment and the electronic device 150 in the fourth embodiment is disposal of a third supporting layer, a fixing device and a keyboard device. As shown in FIG. 9, the electronic device 200 includes the main body 102, the flexible display panel 14, a supporting structure 202 and a keyboard device 204.

The supporting structure 202 is disposed between the main body 102 and the flexible display panel 14 for providing the flexible display panel 14 with supporting force. The supporting structure 202 includes the first supporting layer 116, the second supporting layer 118 and a plurality of third supporting layers 206. The plurality of third supporting layers 206 is arranged in a radial manner and disposed side by side at a position of the first display section 24 corresponding to the connecting portion 108. The plurality of third supporting layers 206 is used for abutting against one another when the cover portion 110 is rotated to the same horizontal surface where the connecting portion 108 and the body portion 106 are located, so as to support the first display section 24 and the second display section 26 cooperatively with the first supporting layer 116 and the second supporting layer 118.

The keyboard device 204 is installed on the body portion 106 for a user to proceed with paper work by the flexible display panel 14. In this embodiment, the keyboard device 204 is embedded in the body portion 106 so as to reduce space occupied by the electronic device 200 when being in the expanded state.

Figure 10:
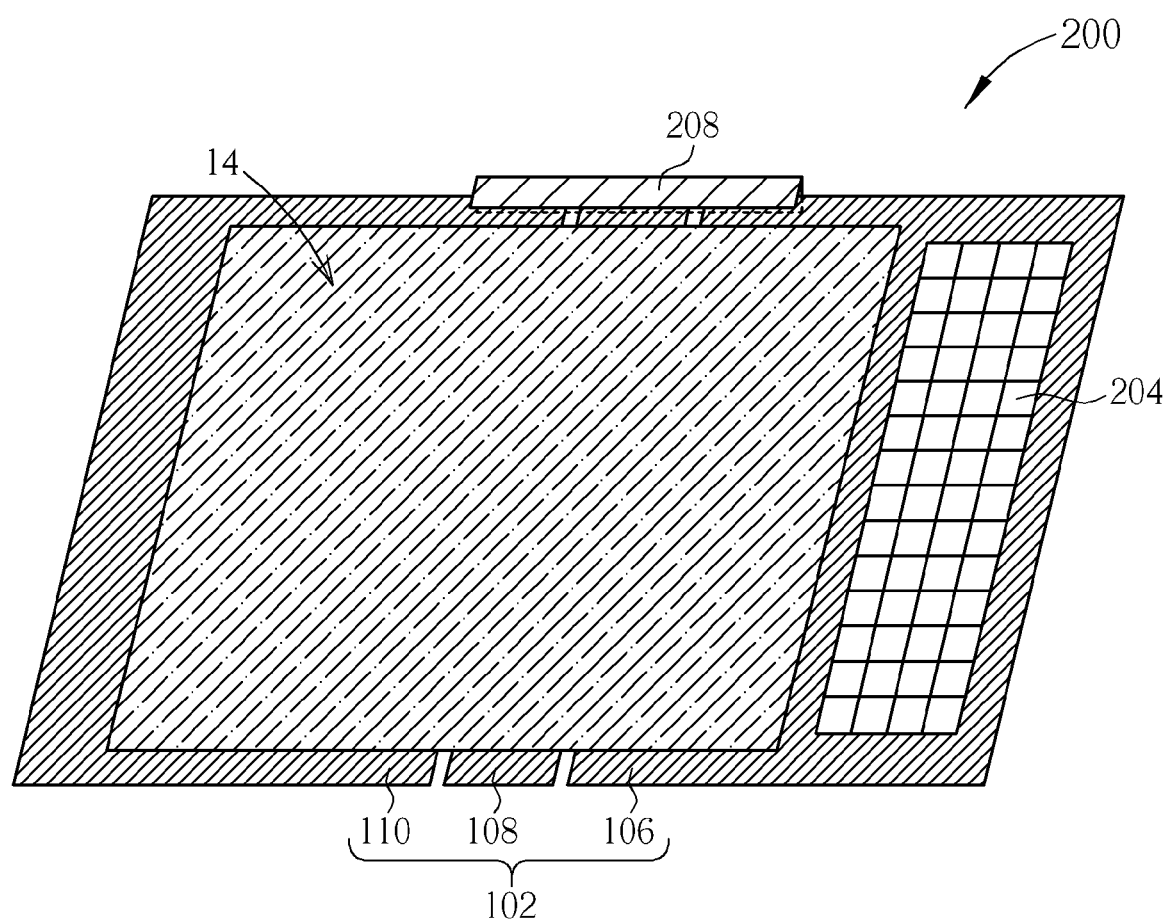
FIG. 10 is a schematic diagram of the electronic device in FIG. 9 when being in an expanded state.

Please refer to FIG. 10, which is a schematic diagram of the electronic device 200 in FIG. 9 when being in an expanded state. As shown in FIG. 10, the electronic device 200 further includes a fixing device 208 slidably disposed on a side of the main body 102. In other words, the fixing device 208 can slide to fix the cover portion 110, the connecting portion 108 and the body portion 106 when the cover portion 110 is rotated to the same horizontal surface where the connecting portion 108 and the body portion 106 are located, so that the electronic device 200 can be securely in the expanded state in FIG. 10. In this embodiment, the fixing device 208 can be a U-shaped holding piece. Furthermore, the fixing device 208 can also be disposed on both sides of the main body 102 so that the electronic device 200 can be in the expanded state more steadily. The fixing device 208 is not limited to the said design. The fixing device 208 may also be a fixing pin or other fixing structure. Furthermore, operation of the fixing device 208 can adopt other design which is commonly seen in the prior art. For example, the fixing device 208 can move to fix the cover portion 110, the connecting portion 108 and the body portion 106 in a rotating manner.

Figure 11:
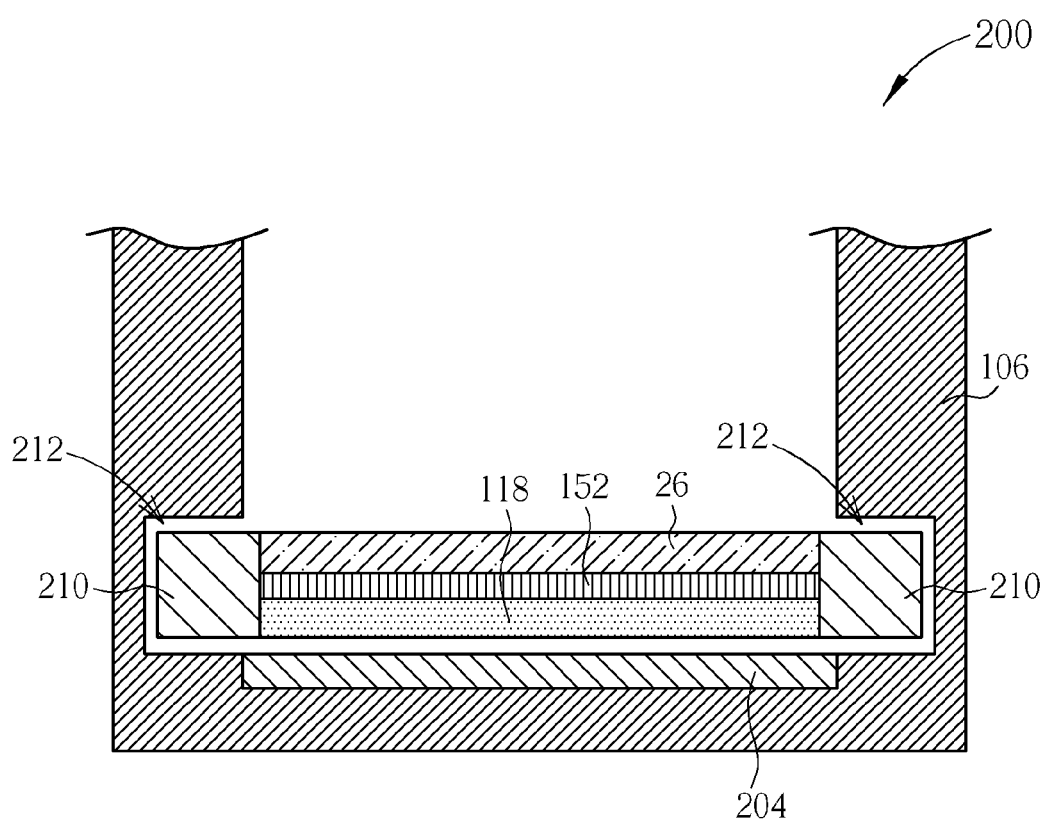
FIG. 11 is a partially sectional diagram of the electronic device in FIG. 9 viewed from its right side.
Figure 12:
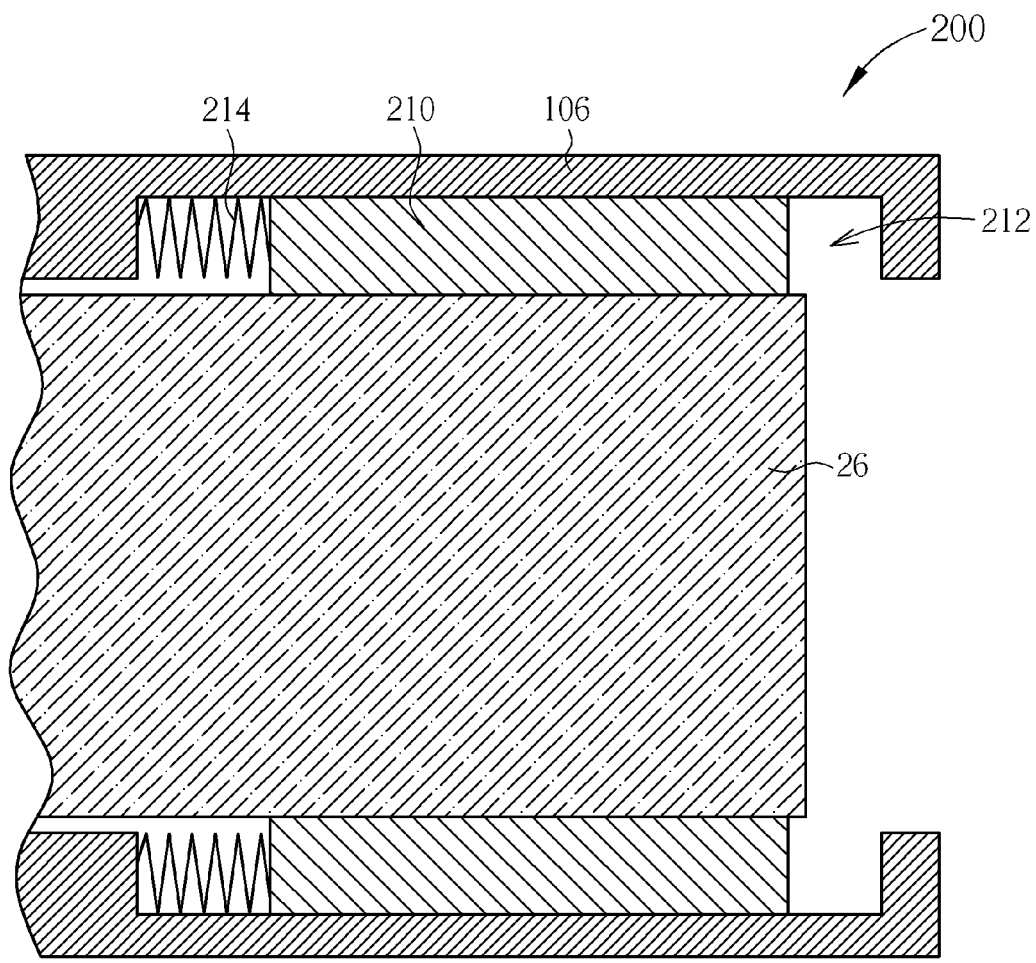
FIG. 12 is a partially internal diagram of a second display section being disposed on a body portion in FIG. 9.

Please refer to FIG. 11 and FIG. 12. FIG. 11 is a partial sectional diagram of the electronic device 200 in FIG. 9 viewed from its right side. FIG. 12 is a partial internal diagram of the second display section 26 being disposed on the body portion 106 in FIG. 9. As shown in FIG. 11, the electronic device 200 further includes two sliding blocks 210, which are connected to both sides of the second display section 26 respectively. Sliding slots 212 are formed on the body portion 106 correspondingly. The sliding block 210 is slidably disposed in the corresponding sliding slot 212, so as to guide the second display section 26 to move relative to the body portion 106 when the cover portion 110 is rotated relative to the body portion 106. Furthermore, as shown in FIG. 12, the electronic device 200 further includes an elastic part 214, which are fully or partially connected to the sliding block 210 and the sliding slot 212. The elastic part 214 is used for providing elastic force to the second display section 26, so as to push or pull the second display section 26 to a proper position when the electronic device 200 is in the expanded state or the folded state. The elastic part 214 is preferably a spring, but is not limited thereto. For example, the elastic part 214 can also be a clip or other structure made of elastic material, such as rubber.

Figure 13:
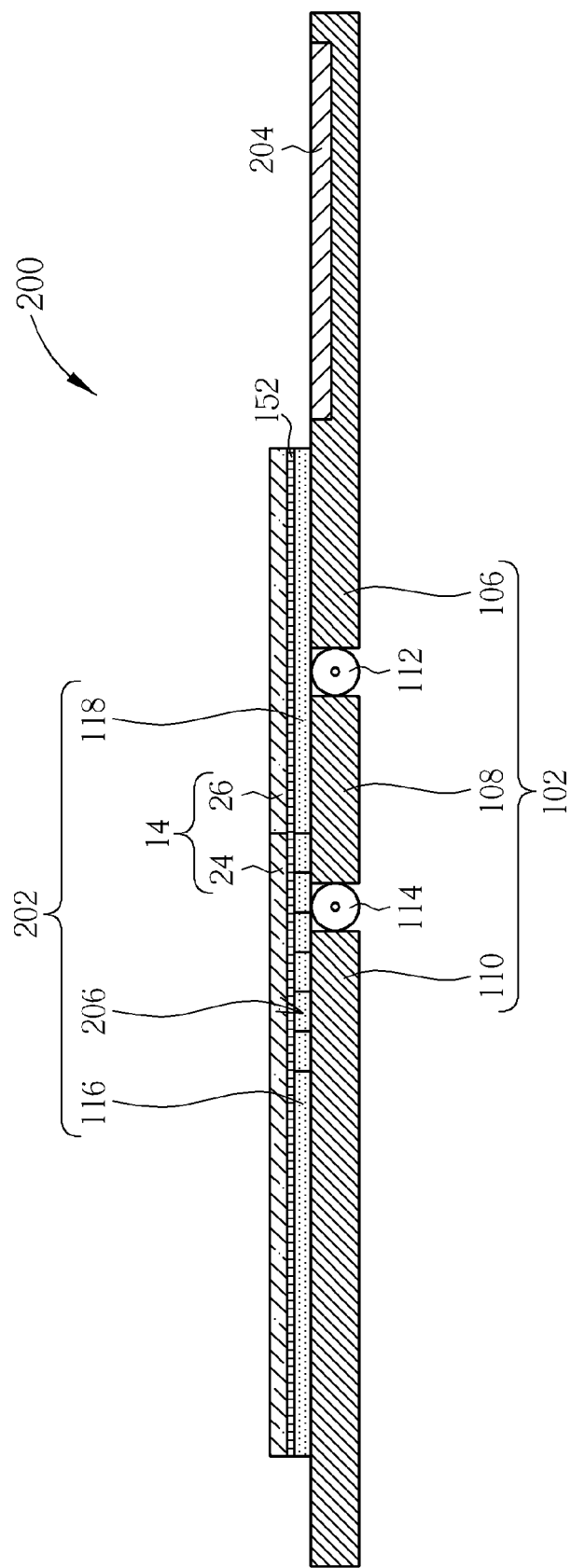
FIG. 13 is a sectional diagram of the electronic device in FIG. 9 when being in an expanded state.

More detailed description for operation of the electronic device 200 is provided as follows. Please refer to FIG. 9, FIG. 10, FIG. 11 and FIG. 13. FIG. 13 is a sectional diagram of the electronic device 200 in FIG. 9 when being in the expanded state. As mentioned above, if the flexible display panel 14 is folded up in the containing space 22, the electronic device 200 cannot only protect the flexible display panel 14 by the foldable design of the main body 102, but also have a smaller volume for the user to carry conveniently. If the user wants to use the flexible display panel 14 folded inside the containing space 22 for watching a displayed content, the user can open the cover portion 110 to rotate relative to the connecting portion 108 and the body portion 106, so that the main body 102 can be changed from a folded state in FIG. 9 to the expanded state in FIG. 13. During the said rotating process, because the first display section 24 is fixed to the cover portion 110 and the second display section 26 is slidably disposed on the body portion 106, the first display section 24 can be rotated with the cover portion 110 from a position in FIG. 9 to a position in FIG. 13. The second display section 26 can be pulled by the first display section 24 and guided by the sliding block 210 sliding along the sliding slot 212, such that the second display section 26 will move from a position that covers part of the keyboard device 204 as shown in FIG. 9 to a position that uncovers the keyboard device 204 as shown in FIG. 13 (at this time, the elastic part 214 is in a compressed state). In the meanwhile, the supporting structure 202 will rotate from a folded state in FIG. 9 to a horizontally expanded state in FIG. 13 with the cover portion 110, wherein the plurality of third supporting layers 206 will be changed from a radial arrangement in FIG. 9 to an arrangement being against one another in FIG. 13. Furthermore, the user can slide the fixing device 208 from a position located on a side of the body portion 102 to a position in FIG. 10, so as to fix the cover portion 110, the connecting portion 108 and the body portion 106. Thus, the electronic device 200 can be in the expanded state securely.

In such a manner, the electronic device 200 cannot only provide an operating sense of opening books, but also provide a bottom of the flexible display panel 14 with a cushion protection and a fully planar support by the soft protecting layer 152, the first supporting layer 116, the second supporting layer 118 and the plurality of third supporting layers 206 when the flexible display panel 14 is in the expanded state. Accordingly, the user can operate the flexible display panel 14 (such as a touch by a touch pen) without concerning damage of the flexible display panel 14 due to a large force applied by user or no support from the bottom of the flexible display panel 14. Furthermore, because the keyboard device 204 is not covered by the second display section 26 when the main body 102 is in the expanded state in FIG. 13, the user can use the keyboard device 204 conveniently.

It should be noticed that the said sliding blocks 210 can be against the pulling force from the first display section 24 cooperatively with the second display section 26 when the first display section 24 rotates with the cover portion 110 so as to make the second display section 26 slide relative to the body portion 106. Accordingly, the pulling force exerted onto the second display section 26 can be reduced, so as to achieve the purpose of protecting the second display section 26.

On the other hand, when the user wants to fold up the electronic device 200, the user needs to push the fixing device 208 to be detached from the cover portion 110, the connecting portion 108 and the body portion 106 first, such that the cover portion 110 can rotate relative to the body portion 106 and the connecting portion 108. Subsequently, the user needs to pull the cover portion 110 to rotate relative to the connecting portion 108 and the body portion 106, such that the main body 102 can be changed from the expanded state in FIG. 13 back to the folded state in FIG. 9. During the said rotating process, the first display section 24 can be folded from the position in FIG. 13 to the position in FIG. 9 with rotary of the cover portion 110. In addition, since the second display section 26 is no longer pulled by the first display section 24, the sliding block 210 can be pushed to slide along the sliding slot 212 by elastic force provided from the elastic part 214, so as to drive the second display section 26 to move from a position in FIG. 13 back to a position in FIG. 9. Accordingly, an automatic return of the second display section 26 can be achieved. In the meanwhile, the supporting structure 202 will be changed from the expanded state in FIG. 13 back to the folded state in FIG. 9 with rotary of the cover portion 110 as well. Accordingly, the electronic device 200 not only takes the foldable design of the main body 102 to protect the flexible display panel 14, but also has a smaller volume for the user to carry conveniently.

Figure 14:
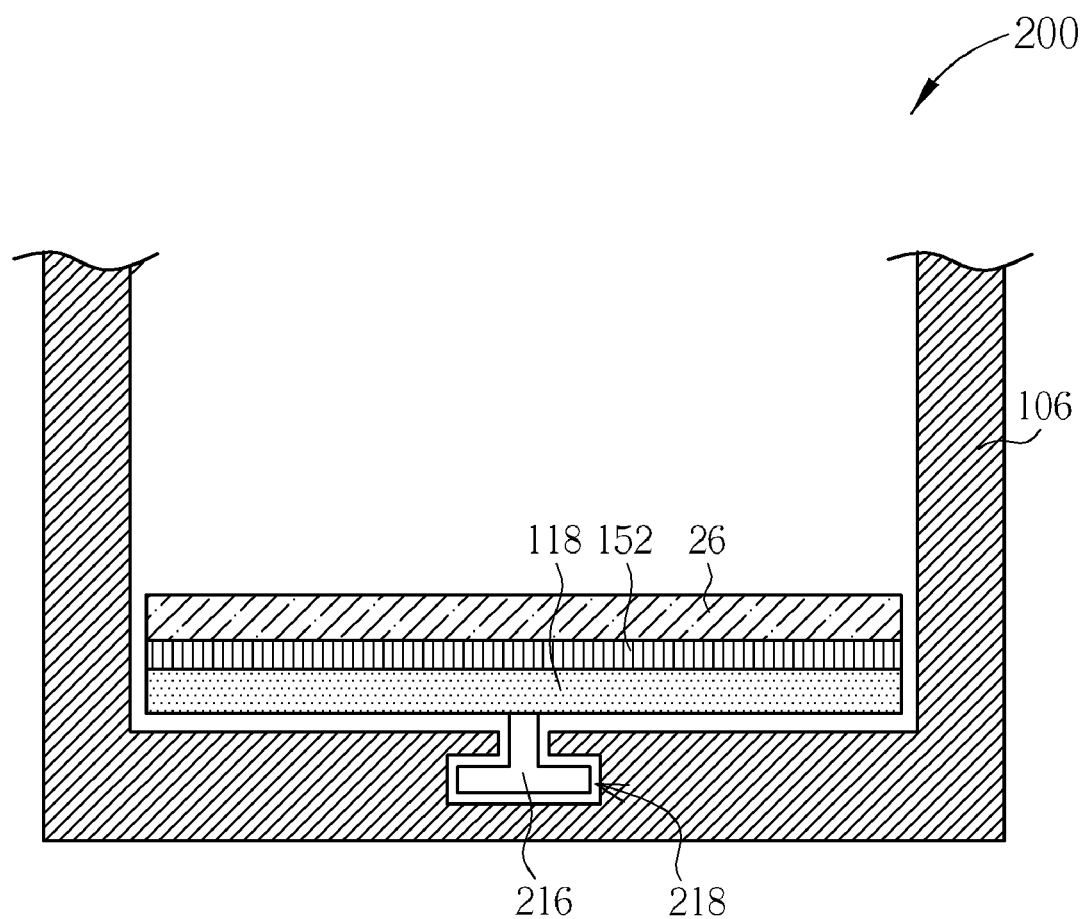
FIG. 14 is a partially sectional diagram of the second display section being disposed on the body portion according to another embodiment of the present invention.

The said guiding design is not limited to assembly of the sliding block and the sliding slot mentioned in the said embodiment, the present invention can also adopt other guiding design. For example, please refer to FIG. 14, which is a partially sectional diagram of the second display section 26 being disposed on the body portion 106 according to another embodiment of the present invention. In this embodiment, the electronic device 200 includes a protruding part 216 instead of the sliding block 210 and the sliding slot 212 mentioned in the aforesaid embodiment. The protruding part 216 is connected to the second supporting layer 118 and is a T-shaped sliding part. A sliding rail 218 is formed on the body portion 106 correspondingly. The protruding part 216 is slidably disposed inside the sliding rail 218, so as to guide the second display section 26 to move relative to the body portion 106 when the cover portion 110 is rotated relative to the body portion 106.

It should be noticed that disposal of the keyboard device 204, the third supporting layer 206, the fixing device 208, the sliding block 210, the sliding slot 212, the elastic part 214, the protruding part 216 and the sliding rail 218 utilized in the electronic device 200 can be alternatively applied to the other embodiments of the present invention, so as to increase the structural variation of the electronic device provided by the present invention. Furthermore, assembly of the keyboard device 204 and the body portion 106 is not limited to the said embodiment. For example, the keyboard device 204 can be pivotally connected to one end of the body portion 106 instead. In such a manner, the keyboard 204 can be folded on the body portion 106 with the flexible display panel 14 when the electronic device 200 is in the folded state, and can be rotated to a side of the body portion 106 for the user to operate when the electronic device 200 is in the expanded state.

Those skilled in the art will readily observe that numerous modifications and alterations of the device and method may be made while retaining the teachings of the invention.

What is claimed is:

1. An electronic device for providing a display panel with planar support, the electronic device comprising:
   a main body comprising:
      a body portion;
      a connecting portion pivotally connected to the body portion; and
      a cover portion pivotally connected to the connecting portion so as to be capable of rotating relative to the body portion, a containing space being formed by the cover portion, the body portion and the connecting portion; and
   a flexible display panel disposed in the containing space in a curved manner, the flexible display panel comprising a first display section and a second display section, the first display section being fixed to the cover portion, the second display section being slidably disposed on the body portion.

2. The electronic device of claim 1, wherein the first display section is attached to the cover portion.

3. The electronic device of claim 1 further comprising:
a supporting structure disposed between the main body and the flexible display panel, the supporting structure being used for providing supporting force to the flexible display panel when the cover portion is rotated to the same horizontal surface where the connecting portion and the body portion are located.

4. The electronic device of claim 3, wherein the supporting structure comprises:
a first supporting layer disposed between the cover portion and the first display section, the first supporting layer being used for providing supporting force to the first display section; and
a second supporting layer disposed on the second display section, the second supporting layer being used for providing supporting force to the second display section.

5. The electronic device of claim 4, wherein the supporting structure further comprises:
a third supporting layer disposed at a position substantially corresponding to the connecting portion, the third supporting layer being used for abutting against the first supporting layer and the second supporting layer when the cover portion is rotated to the same horizontal surface where the connecting portion and the body portion are located, so as to support the first display section and the second display section cooperatively with the first supporting layer and the second supporting layer.

6. The electronic device of claim 4, wherein the supporting structure further comprises:
a plurality of third supporting layers arranged in a radial manner and disposed side by side on the first display section at a position substantially corresponding to the connecting portion, the plurality of third supporting layers being used for abutting against one another when the cover portion is rotated to the same horizontal surface where the connecting portion and the body portion are located, so as to support the first display section and the second display section cooperatively with the first supporting layer and the second supporting layer.

7. The electronic device of claim 1 further comprising:
at least one sliding block connected to a side of the second display section, a sliding slot being formed on the body portion correspondingly, the sliding block being slidably disposed in the sliding slot so as to guide the second display section to move relative to the body portion when the cover portion is rotated relative to the body portion.

8. The electronic device of claim 7 further comprising:
an elastic part connected to the sliding block and the sliding slot, the elastic part being used for providing elastic force to the second display section.

9. The electronic device of claim 1 further comprising:
a protruding part disposed on a side of the second display section, a sliding rail being formed on the body portion correspondingly, the protruding part being slidably disposed inside the sliding rail, so as to guide the second display section to move relative to the body portion when the cover portion is rotated relative to the body portion.

10. The electronic device of claim 9, wherein the protruding part is a T-shaped sliding part.

11. The electronic device of claim 1 further comprising:
a soft protecting layer attached to a side of the flexible display panel corresponding to the main body.

12. The electronic device of claim 1 further comprising:
a pivot shaft pivotally connected to the body portion or to the cover portion so as to make the cover portion capable of rotating relative to the body portion.

13. The electronic device of claim 1 wherein the flexible display panel is an electronic-paper display device or an OLED (Organic Light Emitting Diode) display panel.

14. The electronic device of claim 1 further comprising:
a keyboard device disposed on the body portion.

15. The electronic device of claim 14, wherein the keyboard device is embedded in the body portion.

16. The electronic device of claim 14, wherein the keyboard device is pivotally connected to a side of the body portion.

17. The electronic device of claim 1 further comprising:
a fixing device slidably disposed on a side of the body portion, the fixing device being used for fixing the cover portion, the connecting portion and the body portion when the cover portion is rotated to the same horizontal surface where the connecting portion and the body portion are located.

18. The electronic device of claim 17, wherein the fixing device is a U-shaped holding piece.

* * * * *